(12) United States Patent
Cornelissen et al.

(10) Patent No.: US 11,571,081 B2
(45) Date of Patent: Feb. 7, 2023

(54) KITCHEN APPLIANCE

(71) Applicant: Vorwerk & Co. Interholding GmbH, Wuppertal (DE)

(72) Inventors: Markus Cornelissen, Bornheim (DE); Torsten Lang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 435 days.

(21) Appl. No.: 16/751,338

(22) Filed: Jan. 24, 2020

(65) Prior Publication Data

US 2020/0154926 A1 May 21, 2020

Related U.S. Application Data

(62) Division of application No. 15/547,164, filed as application No. PCT/EP2016/051976 on Jan. 29, 2016, now Pat. No. 10,806,290.

(30) Foreign Application Priority Data

Jan. 29, 2015 (DE) .................... 10 2015 101 299.5

(51) Int. Cl.
*A47J 27/00* (2006.01)
*G01F 23/296* (2022.01)
*G01F 23/2962* (2022.01)

(52) U.S. Cl.
CPC ........ *A47J 27/004* (2013.01); *G01F 23/2962* (2013.01)

(58) Field of Classification Search
CPC ............................ G01F 23/2962; A47J 27/004
See application file for complete search history.

(56) References Cited

U.S. PATENT DOCUMENTS

2004/0112225 A1 6/2004 Mercer et al.
2010/0000315 A1 1/2010 Ramus et al.
(Continued)

FOREIGN PATENT DOCUMENTS

EP 2 452 599 A1 5/2012
EP 2 633 790 A1 9/2013
(Continued)

OTHER PUBLICATIONS

International Search Report of PCT/EP2016/051976, dated Jun. 8, 2016.
(Continued)

*Primary Examiner* — Ibrahime A Abraham
*Assistant Examiner* — Kuangyue Chen
(74) *Attorney, Agent, or Firm* — Collard & Roe, P.C.

(57) ABSTRACT

An electric kitchen appliance has a pot for receiving food to be processed using the electric kitchen appliance. An ultrasound transmitter and an ultrasound receiver are provided in order to determine the fill level of the food in the pot. The ultrasound transmitter and the ultrasound receiver are attached to the upper edge of the pot such that an ultrasound signal can be transmitted onto the surface of the food by the ultrasound transmitter, and an ultrasound signal reflected by the surface of the food can be received by the ultrasound receiver. In this manner, an electric kitchen appliance is provided which allows the fill state of the food in the pot to be determined in a simple and reliable manner.

1 Claim, 2 Drawing Sheets

(56) References Cited

U.S. PATENT DOCUMENTS

2010/0058856 A1  3/2010 Yinko et al.
2010/0282281 A1* 11/2010 Bigott .................... A47L 15/08
                                                    134/56 D

FOREIGN PATENT DOCUMENTS

| FR | 2 617 965 A1 | 1/1989 |
| GB | 2 076 536 A | 12/1981 |
| JP | H11-113738 A | 4/1999 |
| WO | 2009/060192 A2 | 5/2009 |

OTHER PUBLICATIONS

Boeker, Peter. "Chemosensorik und Geruchsmessung", Institut für Landtechnik, Universtität Bonn, in Agrartechnische Forschung 7 (2001), No. 4, pp. 77-81 (Boeker, Peter. "Chemosensorics and Odour Measurement", Institute for Agricultural Engineering, University of Bonn, in Agrartechnische Forschung 7 (2001), No. 4, pp. 77-81).

* cited by examiner

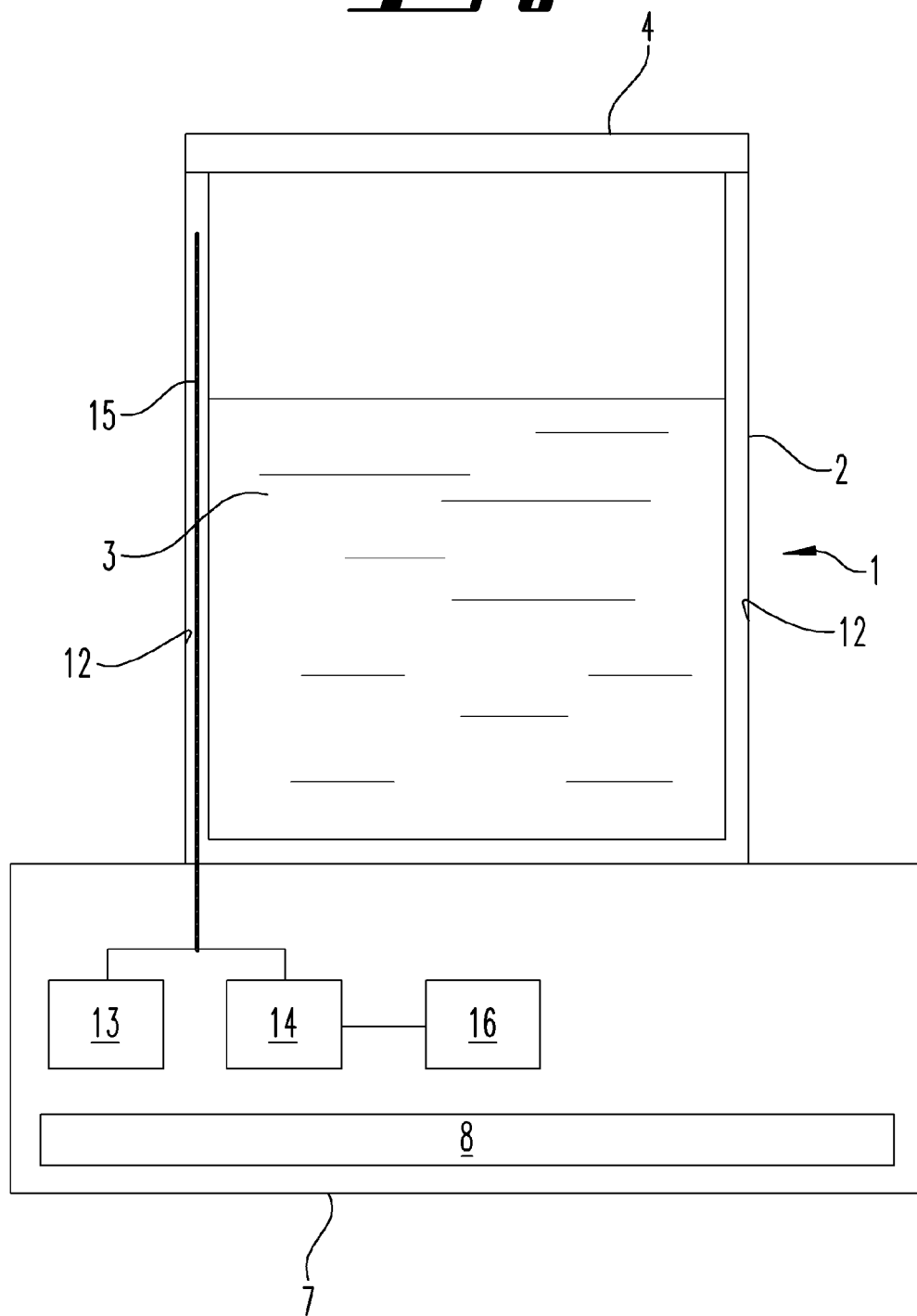

KITCHEN APPLIANCE

CROSS REFERENCE TO RELATED APPLICATIONS

This application is a divisional of U.S. patent application Ser. No. 15/547,164, filed on Jul. 28, 2017, which is the National Stage of PCT/EP2016/051976 filed on Jan. 29, 2016, which claims priority under 35 U.S.C. § 119 of German Application No. 10 2015 101 299.5 filed on Jan. 29, 2015, the disclosures of which are incorporated by reference. The international application under PCT article 21(2) was not published in English.

BACKGROUND OF THE INVENTION

The invention relates, in the first instance, to a kitchen appliance designed with an electrical power supply, which has a pot for purposes of accommodating foodstuffs to be processed with the kitchen appliance, and forming a foodstuffs fill surface, whereby for purposes of determining the fill state of the foodstuffs in the pot an ultrasound transmitter and an ultrasound receiver are provided, and the pot has a pot wall with a wall thickness and a cylindrical or conically developed internal surface.

The invention further concerns a kitchen appliance provided with an electrical power supply with a pot for purposes of accommodating foodstuffs to be processed with the kitchen appliance.

Kitchen appliances that have a pot for purposes of accommodating foodstuffs to be processed with the electrical kitchen appliance, and also frequently a lid for purposes of covering the pot, are well known in the prior art. For example, reference should be made to pressure cookers, and also to multifunctional kitchen machines. The latter are as a general rule provided with such a pot, which enables the accommodation of foodstuffs such that these can be processed in various ways. Such processing of the foodstuffs can, for example, take the form of comminution, stirring or kneading. Moreover, there are such pots of kitchen machines of known art that provide additional functions, such as weighing, and/or heating of the foodstuffs contained therein.

When filling the foodstuffs into such a pot, it is often of great importance to avoid overfilling the pot. For example, if the pot is filled with foodstuffs such as a liquid beyond a predetermined amount, the risk can exist that during the processing of the foodstuffs, e.g. during a mixing process, the foodstuffs exit from the pot. This can be prevented by providing the electrical kitchen appliance with a fill level determination device for purposes of determining the fill level of the foodstuffs in the pot. Here the fill level determination device does not have to enable a regular quantitative measurement of the fill level of the foodstuffs in the pot. On the contrary, it is generally sufficient for the fill level determination device to detect whether the fill height of the foodstuffs in the pot is in fact below a maximum permissible fill height.

From EP 2 633 790 B1 an electrical kitchen appliance with a fill level determination device is already of known art. It is described therein that a transmitter and a receiver for purposes of transmitting or receiving radiation are mounted on the lid in such a way that the fill level in the pot can be detected even when the lid is open.

From US 2004/0112225 A1 a cooking vessel with two temperature sensors is of known art. The evaluation of the temperature sensors is used to deactivate the heating if a difference between the temperatures measured by the two sensors is greater than, or equal to, a predetermined temperature difference.

From US 2010/0058856 A1 a cup-form measuring device is of known art, in which the measuring device has an ultrasound sensor, which is arranged on the upper edge of the cup, protruding into the interior of the cup. From GB 2 076 536 A a device for detecting a fluid level is of known art, in which ultrasound transmitters and receivers are arranged at the rear of a vessel wall, whereby the sound propagation within the wall of the vessel is essential for the determination of the fluid level. US 2010/0000315 A1 shows an electro-optical device integrated into a lid for purposes of detecting a liquid level in a container. JP 11113738 A describes a measuring device on the basis of an ultrasound sensor, which is integrated into a handle of a vessel for purposes of detecting a water level when cooking rice. For purposes of detecting a liquid in a vessel, FR 2 617 965 A1 describes a sensor for purposes of exciting and detecting elastic waves, which passes through an opening in the wall of the vessel.

SUMMARY OF THE INVENTION

Starting from the prior art as described above, the invention is concerned with the task of determining, simply and reliably, the fill level in a pot of a kitchen appliance provided with an electrical power supply.

This task is solved in the first instance by a kitchen appliance wherein the aim is that the ultrasound transmitter and/or the ultrasound receiver is arranged for purposes of transmitting or receiving ultrasound in the region of the cylindrical or conically developed internal surface, with the ultrasound transmitter and/or the ultrasound receiver forming a part of the cylindrical or conically developed internal surface, or an arrangement of the ultrasound transmitter and/or the ultrasound receiver within the wall thickness of the pot wall (12) having the cylindrical or conically developed internal surface, for purposes of applying ultrasound from above onto the foodstuffs fill surface and for purposes of receiving ultrasound reflected upwards from the foodstuffs fill surface.

The task is further achieved with a kitchen appliance, wherein the aim is that a heating element is arranged on the wall of the pot, a heating monitoring device is provided, with which the heating behavior of the heating element can be monitored and from which a heating signal dependent on the heating behavior of the heating element can be outputted, and a fill level checking device, to which the heating signal can be supplied, and from which a fill level check of foodstuffs introduced into the pot can be carried out with regard to a fill level above or below a maximum permissible fill height.

The ultrasound transmitter and the ultrasound receiver are mounted on the pot and thus not, for example, on a lid provided for the pot. In particular, when a lid is provided that is detachable from the pot, this has the advantage that the determination of the fill level of the foodstuffs in the pot can take place independently of the position of the lid, and in particular also irrespectively of whether the lid is attached at all to the electrical kitchen appliance. The provision of the ultrasound transmitter and the ultrasound receiver on the upper edge of the pot also has the advantage that an ultrasound signal can always be transmitted from the top to the bottom of the foodstuffs, even when the fill levels of the foodstuffs in the pot are very high.

In principle, the ultrasound transmitter and the ultrasound receiver can be positioned on the wall of the pot in a continuation of the wall, e.g. they can also be positioned such that they can be detached. In accordance with a preferred development of the invention, however, provision is made for the ultrasound transmitter and the ultrasound receiver to be integrated into the wall of the pot. This ensures that the ultrasound transmitter and the ultrasound receiver are captive components of the pot, and also has hygienic advantages, since when the ultrasound transmitter and the ultrasound receiver are integrated into the wall of the pot, the latter can be manufactured with a smooth surface, which makes it easier to clean.

Furthermore, it is in principle sufficient if one ultrasound transmitter and one ultrasound receiver are provided. In accordance with a preferred development of the invention, however, the ultrasound transmitter and the ultrasound receiver are part of a sensor ring designed on the upper edge of the pot, which has a multiplicity of sensors and thus at least one further sensor. In principle the further sensor can also be an ultrasound sensor. However, provision is preferably made for the further sensor to be a sensor that differs from an ultrasound sensor, e.g. it is a temperature sensor or an "artificial nose". By an "artificial nose" is meant an "electronic nose", which in the narrow sense means chemosensory measuring systems that are based on the biological odour. Hereby it is not possible to determine primary odour properties, instead compositions of gas mixtures are analysed and then reinterpreted as odours. For further details, reference is made, for example, to the essay "Chemosensorics and Odour Measurement", Peter Boeker, Institute for Agricultural Engineering, University of Bonn, in Agrartechnische Forschung 7 (2001), No. 4, Pages 77-81.

In accordance with the invention it is essential that the ultrasound transmitter and the ultrasound receiver can be used to determine the fill level of the foodstuffs in the pot by way of an ultrasound signal transmitted to the surface of the foodstuffs and reflected from the surface of the foodstuffs. In accordance with a preferred development of the invention, however, the ultrasound transmitter has an additional function. According to this preferred development of the invention, an ultrasound controller is provided, by means of which the ultrasound transmitter can be activated such that the pot is cleaned at the same time as the fill level is determined. This means that the ultrasound controller activates the ultrasound transmitter for purposes of pot cleaning with a type of ultrasound signal such that the wall of the pot, at least in some regions, excites oscillations of the type that enable the release of any contamination that may be located there. This preferred configuration of the invention is particularly advantageous because cleaning by means of the ultrasound signal does not require any additional time, but rather can take place at the same time as the determination of level by means of the ultrasound signal transmitted onto the surface of the foodstuffs in the pot. With regard to different sound intensities, which may be used, on the one hand, for determining the fill level, and on the other hand for cleaning purposes, provision can also be made for intermittent operation of the ultrasound transmitter in this respect. Provision can also be made for the ultrasound sensor and the ultrasound receiver to operate on the one hand in a mode for purposes of detecting the fill level, and, on the other hand in the cleaning mode, in particular if a different sound intensity is associated with the latter. These operating modes can then either be freely selected by a user, or can be predetermined by a control program of the kitchen machine.

The ultrasound transmitter and the ultrasound receiver can be mounted separately from one another as different devices on the upper edge of the pot. In accordance with a preferred development of the invention, however, the ultrasound transmitter and the ultrasound receiver are collectively designed as one transducer. This simplifies the design of the electrical kitchen appliance and reduces the costs because only a single ultrasound device is required for the level measurement.

It is an important aspect of one configuration of the invention that the heating behavior of the heating element can be monitored such that a heating signal that is dependent on the heating behavior of the heating element can be evaluated in the context of a determination of the fill level. The principle underlying this aspect of the invention is that when there is constant activation of the heating of the heating element, the latter depends on the extent to which heat can be delivered to foodstuffs introduced into the pot. The higher the fill level of the foodstuffs in the pot, the more the heat that can be delivered to the foodstuffs, so that there is a correspondingly lower heating of the heating element itself. This heating behavior, that is to say, the degree of heating of the heating element, can be determined by the heating monitoring device, whereby the latter outputs a corresponding heating signal to the fill level checking device, which as a function of this heating signal can check whether the fill level of the foodstuffs in the pot lies above or below a maximum permissible fill height.

In principle any device with which the heating, that is to say, the heating behavior of the heating element, can be detected, is suitable as a heating monitoring device. In accordance with a preferred development of the invention, however, a thermocouple and/or an electrical ohmmeter is provided as the heating monitoring device. With the thermocouple, the temperature of the heating element can be detected in a direct manner. An electrical ohmmeter can detect the temperature of the heating element by way of the principle that the electrical resistance of the heating element increases with increasing temperature of the heating element. Assuming that an appropriate calibration is available, the temperature of the heating element can thus be detected with the thermocouple or with the electrical ohmmeter such that an admissible, or too high a, filling of the pot with the foodstuffs can be detected by means of the fill level checking device.

The heating element can be provided on the wall or on top of the wall of the pot. In accordance with a preferred development of the invention, however, the heating element is integrated into the wall of the pot. In particular this has also hygienic advantages, since in this way the wall of the pot can be designed to be smooth, which facilitates cleaning.

BRIEF DESCRIPTION OF THE DRAWINGS

In what follows, various embodiments are described in more detail for purposes of explaining the invention with reference to the figures. In the figures FIG. 2 shows schematically an electrical kitchen appliance in accordance with a second preferred example of embodiment of the invention with a strip-form heating element for purposes of level determination.

DETAILED DESCRIPTION OF THE EMBODIMENTS

Figure 1:
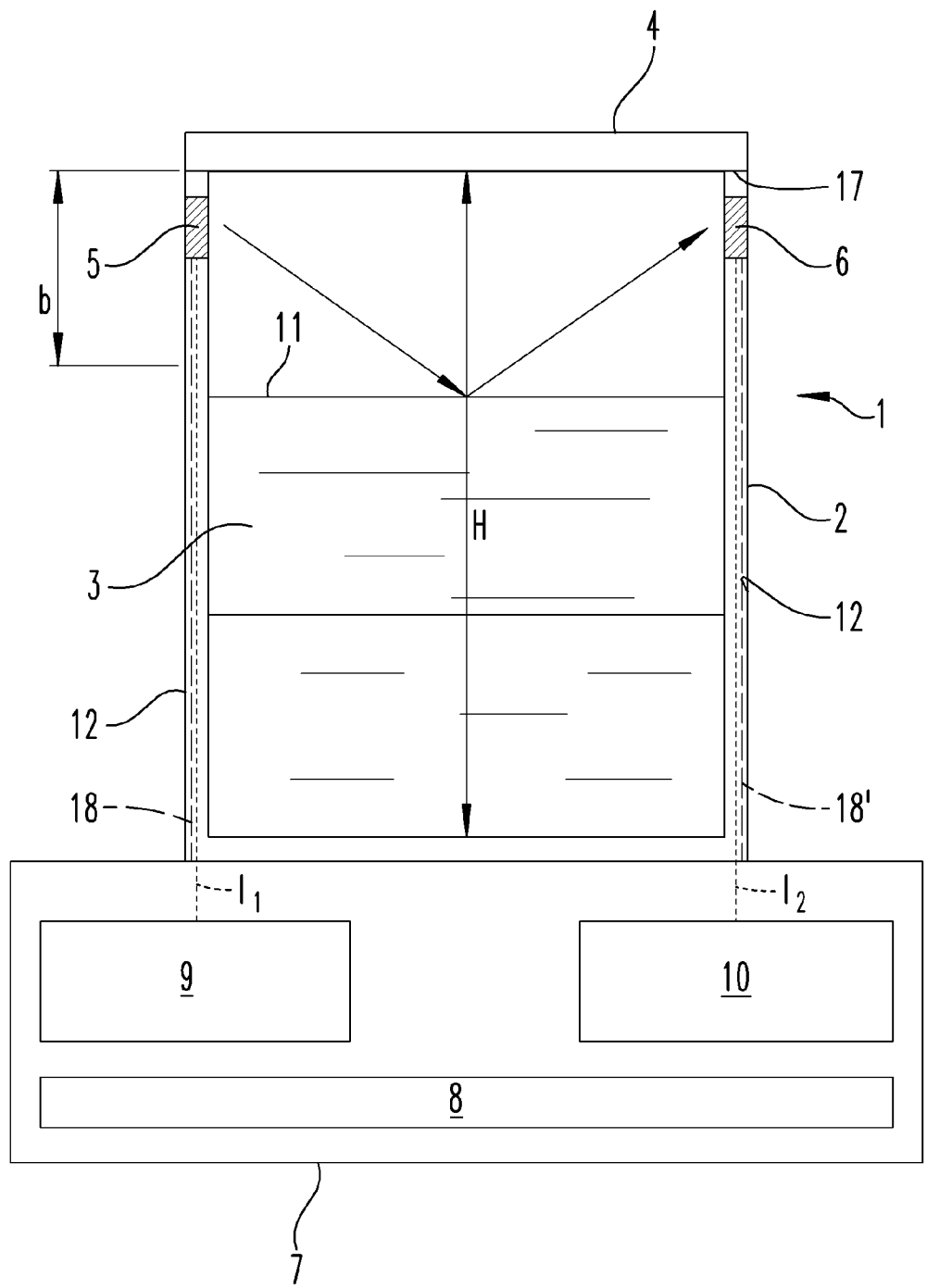
FIG. 1 shows schematically an electrical kitchen appliance in accordance with a first preferred example of embodiment of the invention, with an ultrasound transmitter and an ultrasound receiver for purposes of level determination.

FIG. 1 shows schematically an electrical kitchen appliance 1 with a pot 2 for purposes of accommodating foodstuffs 3 to be processed with the electrical kitchen appliance 1. A lid 4 serves to close the pot 2. An ultrasound transmitter 5 and an ultrasound receiver 6 are provided for purposes of determining the fill level of the foodstuffs 3 present in the pot 2, which in the present case is a liquid. For this purpose, the ultrasound transmitter 5 and the ultrasound receiver 6 are mounted at the upper edge of the pot 2, and specifically in the wall 12 of the pot 2. In this way, a smooth surface is also provided in the interior of the pot 2, which is advantageous for hygienic reasons, and in particular permits simple cleaning of the pot 2.

The pot can be a metal pot. The pot can consist of a steel material. It can, for example, be produced by the deep drawing process. The pot can also consist of several materials, in particular a metallic part and a plastic part. The plastic part can be attached to the outside of the metal part. The plastic part can be provided over part of the circumference of the pot, or can completely surround the pot. In the latter case, however, the surround can only be designed over part of the height of the pot. Also, for example, over an intermediate region of the height, so that the foot region of the pot and the edge region do not have any plastic surround (in the circumferential direction). The plastic part can, for example, also be designed as a pot handle. The arrangement of the ultrasound transmitter 5 and/or the ultrasound receiver 6 within the pot wall can also mean that these parts are at least partly, but possibly also completely, accommodated in a plastic part of the pot.

At the upper edge of the pot 2, preferably means that, with reference to a free internal height H of the pot, they are arranged within a region b, which starts at the top edge 17, which is one third or less, for example as little as $1/100$, of the free internal height H. Thus all intermediate values, in particular in $1/100$ steps, are also therefore in a region b, which ranges from 0.32 up to the top edge, or $1/100$ or more distant from the top edge. The boundary of this region—starting from the top edge in the direction towards the bottom of the pot —can also be varied in $1/100$ steps. In particular, a region is also covered, which as region b corresponds to a quarter of the internal height H, or an eighth, or a sixteenth of the internal height H.

In accordance with the preferred embodiment of the invention that can be seen in FIG. 1, the pot 2 of the electrical kitchen appliance 1 is mounted on a base 7 of the kitchen appliance In this base 7, in addition to a central control device 8 for the general control of the electrical kitchen appliance 1, are provided an ultrasound control unit 9 together with an ultrasound evaluation unit 10. As indicated by the dashed lines l1, l2, the ultrasound controller 9 is connected to the ultrasound transmitter 5, and the ultrasound evaluation device 10 is connected to the ultrasound receiver 6. The lines l1 and l2 can just be signal cables. In addition, another cable 18, 18' can also be provided for the supply of power to the ultrasound sensor and/or the ultrasound receiver.

The functioning of the electrical kitchen appliance 1 in accordance with the preferred example of embodiment of the invention presently described is now as follows:

The ultrasound transmitter 5 is activated with the ultrasound controller 9 such that, as indicated by an arrow pointing obliquely downwards, an ultrasound signal is transmitted downwards towards the surface 11 of the foodstuffs 3 in the pot 2. There a partial reflection of the ultrasound signal takes place, such that a reflected proportion of the ultrasound signal runs back obliquely upwards and there impinges on the ultrasound receiver 6. The signal received by the ultrasound receiver 6 is then transmitted to the ultrasound evaluation device 10, which in turn can determine the level of the foodstuffs 3 in the pot 2 from the transit time of the ultrasound signal from the ultrasound transmitter 5 to the ultrasound receiver 6. The electrical kitchen appliance 1 can only be switched on when the fill level thereby determined is below a predetermined maximum fill level, and there is thus no overfilling of the pot 2. The corresponding functionality is implemented in the central control unit 8.

By virtue of the arrangement of ultrasound transmitter 5 and ultrasound receiver 6 at the upper edge of the pot 2, it is irrelevant whether the lid 4 is attached to the electrical kitchen appliance 1 or, how the lid 4 is positioned on the pot 2. Since in accordance with the presently described preferred example of embodiment of the invention the lid 4 is completely removable from the pot 2, this is of great advantage, since the determination of the fill level of the foodstuffs 3 in the pot 2 is completely independent of the lid 4, and thus functions even when the lid 4 is not attached to the pot 2 at all.

In addition to the functionality of the ultrasound transmitter 5 for purposes of transmitting an ultrasound signal to the surface 11 of the foodstuffs 3 in the pot 2, by means of the ultrasound control unit 9, a type of activation of the ultrasound transmitter 5 is also possible such that the pot 2 is cleaned at the same time as the fill level is determined. For this purpose, an activation of the ultrasound transmitter 5 at a suitable frequency and a sufficiently large amplitude is required in order to excite the wall 12 of the pot 2 into vibrations that are such as to enable a release of any contaminants that are fixed there. A cleaning operation of this type thus takes no additional time, since it can take place at the same time as the detection of the fill level of the foodstuffs 3 in the pot 2.

Conventionally, frequencies of 20 to 400 kHz are used, in particular for ultrasound cleaning. Preference is given to frequencies in the range from 20 to 15 kHz. However, higher frequencies are also beneficial for cleaning, in particular with respect to comparatively small particles. For example, frequencies in the region of 200 kHz, that is to say, from approximately 180 to 220 kHz, are used for cleaning with regard to particles with a diameter of more than 1 μm. For the release of particles of even smaller diameters, the above-mentioned bandwidth can also be extended further up to 2 MHz.

With regard to the acoustic power, 50 watts or more, up to, for example, 2,400 watts is preferred. This is the case if it takes the form of a cleaning application.

In the case of a level measurement, it is also possible to work with lower, even considerably lower, powers. For example, in the range of 0.5-5 watts. However, in a level measurement a higher frequency is preferably used. For example, in the range from 350 to 450 kHz, preferably from 370 to 390 kHz, and more preferably at 380 kHz.

However, level detection is also possible in the course of a cleaning application, and with the frequencies and powers described with respect to the latter, for which purpose vibrations generated by the pot are evaluated with regard to their decay characteristics, that is to say, for example, how quickly after termination of the application of ultrasound, the level of oscillation of the pot, which was previously excited by the application of ultrasound, falls below a certain predetermined level, so as to draw a conclusion on the mass that is in the pot.

With regard to the cleaning behavior and also, for example, the option of fill level measurement most recently described, it is also sufficient if an ultrasound transmitter and an ultrasound receiver are just coupled to the metallic part of a pot.

They do not have to be in the interior of the wall. They can, therefore, in this respect be arranged in the pot exterior. However, if so desired, they can also be embedded in, and surrounded by, a plastic part, or another protective part.

With regard to a level measurement with an ultrasound transmitter radiating into the interior of the pot, it is preferable if, when the pot is being conventionally used, the direction of the ultrasound beam is such that it has a downward angle with respect to the horizontal of some 30-70 degrees, preferably 40-60 degrees, and more preferably approximately 50 degrees.

FIG. 2 shows an electrical kitchen appliance 1 in accordance with a second preferred example of embodiment of the invention. Instead of using an ultrasound signal, a determination of the fill level of the foodstuffs 3 in the pot 2 here takes place by means of a strip-form heating element 15, which is preferably integrated into the wall 12 of the pot 2. This heating element 15 is activated and thus heated by a heating controller 13, which is provided in the base 7 of the electrical kitchen appliance 1. The heating element 15 is furthermore connected to a heating monitoring device 14, with which the heating behavior of the heating element 15 can be detected. A heating signal that is a function of the heating behavior of the heating element 15 is then outputted by the heating monitoring device 14 to a fill level checking device 16, with which the fill level of the foodstuffs 3 in the pot 2 can be checked.

The principle of the level measurement consists in the fact that with constant activation for purposes of heating the heating element 15, its heating depends on how much heat can be delivered to the foodstuffs 3 in the pot 2. The higher the fill level of the foodstuffs 3 in the pot 2, the greater is the volume of the foodstuffs 3 and thus the heat capacity of the foodstuffs 3, so that correspondingly more heat can be delivered to the foodstuffs 3. This results in correspondingly lower heating of the heating element 15.

This heating behavior, that is to say the degree of heating of the heating element 15, is determined by the heating monitoring device 14, which transmits a corresponding heating signal to the fill level checking device 16, which checks whether the fill level of the foodstuffs 3 in the pot 2 lies above or below a maximum permissible fill height, which allows a regular and safe operation of the electrical kitchen appliance 1.

In the present case, an electrical ohmmeter is provided as the heating monitoring device 14. With the electrical ohmmeter, the temperature of the heating element 15 is detected by way of the principle that the electrical resistance of the heating element 15 increases as the temperature of the heating element 15 increases. In accordance with an appropriate calibration, the temperature of the heating element 15 is detected with the electrical ohmmeter, so that a permissible fill, or too high a fill, of the pot 2 with the foodstuffs 3 can be detected by means of the fill level checking device 16.

LIST OF REFERENCE SYMBOLS

1 Electrical kitchen appliance
2 Pot
3 Foodstuffs
4 Lid
5 Ultrasound transmitter
6 Ultrasound receiver
7 Base
8 Central control unit
9 Ultrasound controller
10 Ultrasound evaluation device
11 Surface
12 Wall of the pot
13 Heating controller
14 Heating monitoring device
15 Heating element
16 Fill level checking device
17 Pot edge
18 Cable
18' Cable
b Region
I1 Line
I2 Line
H Internal height

What is claimed is:
1. A kitchen appliance configured for processing foodstuffs by comminution, stirring or kneading, comprising:
   a base having a central control device configured for controlling the kitchen appliance, a heating controller, a heating monitoring device in the form of a thermocouple and/or an electrical ohmmeter, a fill level checking device in the form of a microprocessor and an electrical power supply,
   a pot mounted on the base, the pot being configured to accommodate foodstuffs to be processed,
   a heating element integrated into a wall of the pot and being activated by the heating controller, wherein the heating element is in the form of a strip,
   wherein the heating monitoring device is configured for monitoring temperature and/or electrical resistance of the heating element, and for outputting a heating signal dependent on the temperature and/or electrical resistance of the heating element to the fill level checking device, and
   wherein the fill level checking device, to which the heating signal is supplied, is configured to process the heating signal and to carry out a fill level check of the foodstuffs introduced into the pot with regard to a fill level above or below a maximum permissible fill height, as a function of the heating signal.

* * * * *